Patented July 19, 1932

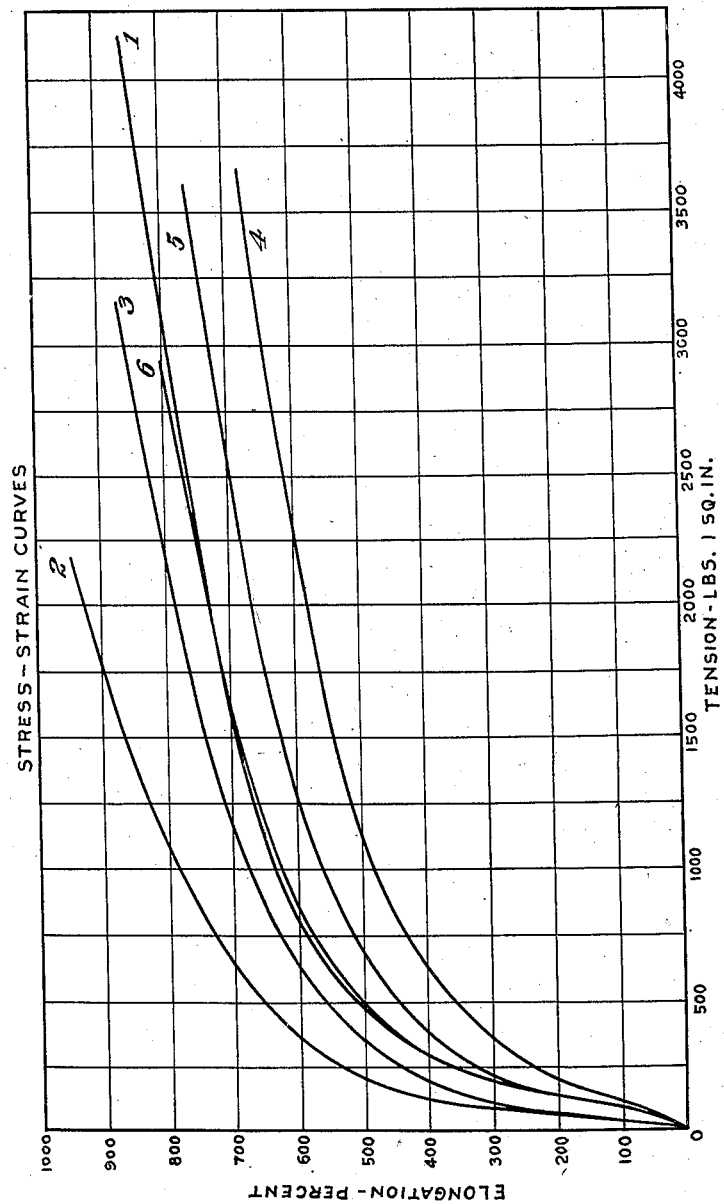

1,867,631

UNITED STATES PATENT OFFICE

CHARLES J. ROMIEUX, OF ELIZABETH, AND LUDWIG J. CHRISTMANN, OF JERSEY CITY, NEW JERSEY, ASSIGNORS TO AMERICAN CYANAMID COMPANY, OF NEW YORK, N. Y., A CORPORATION OF MAINE

RUBBER ACCELERATOR AND METHOD OF USING THE SAME

Application filed December 30, 1931. Serial No. 583,924.

This invention relates to substances particularly adapted for improving the vulcanization of rubber and to a method of using the same.

A large number of compounds which are incorporated into the rubber mix prior to vulcanization for the purpose of imparting desirable characteristics to the rubber and to improve the conditions of vulcanization, are now in common use. Among the substances adapted for accelerating the vulcanization of rubber and which have been used to a considerable extent in the rubber industry are di-substituted guanidines, hexamethylenetetramine, thiocarbanilide and many others, all of which contain nitrogen. We have now found that a large number of compounds containing phosphorous as an essential element thereof and more specifically substituted phosphoric acids are excellent rubber accelerators which compare favorably with, and are in many cases far superior to the best rubber accelerators previously on the market.

Our discovery is based on the conception that the reaction product of an organic compound with sulphur and phosphorous has accelerating properties. Although the sulphur and phosphorous may be used in the elemental form we prefer to combine the same prior to the reaction to form phophorous pentasulphide. A large variety of organic compounds may be combined with the phosphorous pentasulphide, particularly oxygen containing organic compounds, either of the aromatic or of the aliphatic types and preferably containing a hydroxyl group. We have found that alcohols are eminently adapted for the present invention and we have produced and used the reaction products of amyl and butyl alcohols and sulphur and phosphorous in the form of phosphorous pentasulphide, which products have proven to be excellent rubber accelerators.

We have further found that many of the products made by the process above mentioned may be improved greatly by the addition thereto of a compound having basic properties, for instance a metal oxide or a nitrogen compound such as a guanidine. For example, we have combined an amyl reaction product of phosphorous pentasulphide with a di-substituted guanidine such as diphenylguanidine and have obtained a rubber accelerator which compares excellently with the accelerators previously used, whether the vulcanization is carried out at a high temperature or at a low temperature. It would appear that the addition of a compound, having basic properties and which is in itself a rubber accelerator, to the reaction product of an organic compound with phosphorous pentasulphide or its equivalent, results in an excellent accelerator which is in many cases far superior to the accelerating value of the added accelerator.

The manufacture of the substances constituting the subject matter of this invention is very simple. The general procedure is to place the organic compound in a suitable receptacle and add thereto the necessary amount of phosphorus pentasulphide and then subject the mixture to gentle heating. Generally the temperature is at the boiling point of the organic compound and a reflux condenser is used to prevent loss of materials. The reaction product which is probably a di-substituted di-thiophosphate is removed from the reaction vessel and may be used directly as a rubber accelerator. If it is desired to still further modify the product there may be added to the reacted mass a suitable substance, such as di-phenylguanidine or lead acetate or zinc acetate, which causes a reaction to take place with the evolution of heat and the mixture is, therefore, generally kept cool to avoid losses.

It will be noted that the method of preparation is very simple, it being essential only to provide a reaction vessel of some kind with means for heating and cooling the same, generally coils of pipe in the bottom of the receptacle, and a condenser of some kind to avoid losses of volatile ingredients. The compounds formed in accordance with this invention are probably substituted thiophosphoric acids, having in the case of the first reaction products the following structural formula:

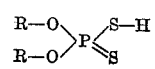

in which R represents an organic radicle of the aliphatic or aromatic type such as phenyl, amyl and the like. The rubber accelerators formed by treatment of the above identified products, which have been found to give an acid reaction, with other compounds of a basic nature to produce addition products, most probably salts of the above acids.

As an example of the manufacture of the substances constituting the subject matter of the present invention, we placed 176 parts of commercial amyl alcohol in a reaction vessel fitted with a reflux condenser and added thereto 111 parts of commercial phosphorous pentasulphide. The mixture was heated gently to the boiling point of the amyl alcohol until all of the phosphorous pentasulphide had gone into solution, after which the reaction mixture was filtered. The product which is considered to be hydrogen-di-amyl-di-thiophosphate or di-amyl-di-thiophosphoric acid was tested as an accelerator with the very favorable results given below.

The reaction taking place in the described example is probably as follows:

$$P_2S_5 + 4C_5H_{11}OH = 2(C_5H_{11}O)_2PS_2H + H_2S.$$

The constitution thereof was probably as follows:

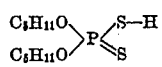

phate with 633 parts of di-phenylguanidine. The di-phenylguanidine went into solution with the evolution of heat, which was probably due to the neutralization of the acidity of the di-thio acid, and the mixture was, therefore, kept cool to avoid loss. Upon being tested as a rubber accelerator it gave remarkable results as specifically set forth below. The compound most probably has the following structural formula:

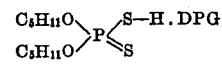

In testing the compounds of the present invention, we incorporated the same with a rubber mix in accordance with the following formula and cured each mix for thirty minutes at a vulcanization temperature of 288° F.

| | Parts by weight |
|---|---|
| Pale crepe | 100 |
| Zinc oxide | 5 |
| Sulphur | 5 |
| Test material | 1 |

The stress strain curves for the test pieces are tabulated below.

| Compound | Stress strain data | | | | | | | Cures at 288° F. | |
|---|---|---|---|---|---|---|---|---|---|
| | Elongation % | | | | | | | Break | |
| | 300 | 400 | 500 | 600 | 700 | 800 | 900 | Tension | Elongation % |
| | Lbs./Sq. in. | | | | | | | | |
| Lead diphenyl-di-thiophosphate | 145 | 190 | 310 | 580 | 1,095 | 2,030 | | 2,730 | 860 |
| D. P. G. di-phenyl-di-thiophosphate | 130 | 175 | 235 | 440 | 860 | 1,545 | | 2,585 | 900 |
| Di-amyl-di-thiophosphoric acid | 155 | 215 | 345 | 575 | 1,050 | 2,065 | | 2,835 | 855 |
| Lead di-amyl-di-thiophosphate | 180 | 285 | 475 | 860 | 1,675 | 3,125 | | 3,380 | 815 |
| Di-butyl-di-thiophosphoric acid | 195 | 295 | 475 | 840 | 1,520 | | | 2,850 | 800 |
| D. P. G. di-butyl-di-thiophosphate | 110 | 130 | 170 | 250 | 435 | 850 | 1,410 | 2,090 | 985 |
| Di-phenylguanidine | 230 | 375 | 680 | 1,260 | 2,550 | | | 3,625 | 760 |
| Mercaptobenzothiazole | 200 | 300 | 475 | 800 | 1,575 | | | 2,950 | 800 |

A similar mix was used to test some of the materials for the cures at a lower temperature, these mixes being cured for 30 minutes at 258° F. with the following results:

| Compound | Stress strain data | | | | | | | Cures at 258° F. | |
|---|---|---|---|---|---|---|---|---|---|
| | Elongation % | | | | | | | Break | |
| | 300 | 400 | 500 | 600 | 700 | 800 | 900 | Tension | Elongation % |
| | Lbs./Sq. in. | | | | | | | | |
| Di-amyl-di-thiophosphate | 115 | 145 | 195 | 315 | 565 | 1,000 | 1,640 | 2,230 | 965 |
| Lead di-amyl-di-thiophosphate | 120 | 165 | 215 | 350 | 655 | 1,165 | 1,960 | 2,220 | 930 |
| D. P. G. di-amyl-di-thiophosphate | 195 | 295 | 440 | 810 | 1,675 | 3,120 | | 4,165 | 855 |
| Di-phenylguanidine | 75 | 125 | 200 | 375 | 625 | 1,100 | 1,775 | 2,200 | 945 |
| Mercaptobenzothiazole | 110 | 195 | 330 | 625 | 1,175 | 2,250 | | 3,175 | 865 |

To illustrate the second stage of the process whereby an addition product is formed with the di-thio-substituted phosphoric acid, we mixed 714 parts of di-amyl-di-thiophos- In the accompanying drawing constituting a part hereof, the six curves represent comparative results obtained in the vulcanization with first compounds of the present invention, second di-phenylguanidine which is considered to be one of the best of the accelerators used heretofore, and third mercaptobenzothiazole a commercial accelerator which is generally considered among the best low temperature accelerators. Curve 1 is the stress strain curve of a rubber mix made with di-phenylguanidine di-amyl-di-thiophosphate. Curve 2 is one in which di-phenylguanidine was used as an accelerator and curve 3 in which mercaptobenzothiazole accelerator was used, all of the vulcanizations being conducted for 30 minutes at 258° F. with the same quantities of the test materials in the mixes. The results clearly show that di-phenylguanidine di-amyl-di-thiophosphate is by far the most active of the three.

Curves 4, 5 and 6 were obtained in exactly the same way to compare the same three rubber accelerators but the vulcanization took place at 288° F. Here again the superiority of di-phenylguanidine di-amyl-di-thiophosphate is clearly demonstrated.

We have prepared the di-phenyl-di-thiophosphoric acid by dissolving phosphorous pentasulphide in crude phenol and have tested the same in a rubber mix of the following formula which was cured for 30 minutes at 288° F.

|  | Parts by weight |
|---|---|
| Pale crepe | 100 |
| Lead oxide | 5 |
| Sulphur | 5 |
| Test material | 1 |

It will be noted that our invention provides a simple and inexpensive method of producing rubber accelerators which are very effective in vulcanization. Not only are the raw materials used cheap and easy to obtain, being of the nature of phosphorous pentasulphide, phenols, alcohols, and amines, the market for which is stable, but the process of preparation thereof is so extremely simple that very little skill is required of the workman. It is merely necessary to add the several substances to the reaction vessel and allow the reaction to go to completion. At the most, in the preparation of our new substances, there are three steps. First the reaction between the organic compound and phosphorous pentasulphide or its equivalent, a mixture of phosphorous and sulphur. Second, the reaction of this product with another substance which is accomplished in the same reaction vessel, and third, the filtering thereof if necessary.

Although we have described specifically the manufacture of two of the substances included in our invention it will be understood that the specific details of the method of producing the compounds may be changed in many respects.

The several substances illustrated above as being included in our invention do not by any means constitute all of the substances which we have found to be effective for the purpose set forth but they are merely representative of a large number of compounds which are excellent accelerators and which may be produced at low cost.

This group of accelerators includes the various organic di-substituted di-thiophosphates prepared by reacting phosphorous pentasulphide with such compounds as methyl alcohol, ethyl alcohol, normal propyl alcohol, isopropyl alcohol, the butyl alcohols such as the normal, secondary and tertiary, the various amyl alcohols, the hexyl alcohols, the heptyl alcohols, the octyl alcohols, the cetyl alcohols, cyclohexanol and similar ring alcohols of the hydroaromatic hydrocarbons, phenol, the cresols, the cresylic acids, the xylenols, mesitol, the naphthols, anthranol, etc. Of course it is obvious that the various isomeric forms of these organic compounds are operative to form the accelerators. In place of the pure compounds, valuable accelerators are also prepared by using the commercial forms of the compounds which, in many cases, contain mixtures of various isomerides.

As pointed out previously, various addition compounds of the di-thiophosphates and substances having basic properties may be prepared. These basic substances include metal oxides such as zinc oxide, lead oxide, copper oxide, and mercuric oxide. The basic nitrogen compounds are also suitable and these include di-phenylguanidine, methylamine, dimethylamine, dimethylaniline, beta-naphthylamine, diphenylamine, p-phenylenediamine, p-aminophenol, p-nitraniline, piperidine, pyridine, ammonia, aniline, o-toluidine, diorthotolyl guanidine, etc.

The following are examples of a number of compounds falling within the scope of this invention: zinc diphenyl dithiophosphate, lead diphenyl dithiophosphate, D. P. G. diphenyl dithiophosphate, diamyl dithiophosphoric acid, lead diamyl dithiophosphate, D. P. G. diamyl dithiophosphate, dibutyl dithiophosphoric acid, D. P. G. dibutyl dithiophosphate, D. P. G. salt of ethyl dithiophosphoric acid, D. P. G. salt of di-isopropyl dithiophosphoric acid, D. P. G. salt of di-n-butyl dithiophosphoric acid, aniline salt of diethyl dithiophosphoric acid, aniline salt of di-isopropyl dithiophosphoric acid, methylamine salt of di-isopropyl dithiophosphoric acid, dimethylamine salt of di-isopropyl dithiophosphoric acid, dimethylaniline salt of di-isopropyl dithiophosphoric acid, B-napthylamine salt of di-isopropyl dithiophosphoric acid, diphenylamine salt of di-isopropyl dithiophosphoric acid, p-phenylenediamine salt of di-isopropyl dithiophosphoric acid, p-aminophenol salt of di-isopropyl dithiophosphoric acid, p-nitraniline salt of di-isopropyl dithiophosphoric acid, piperidine salt of di-isopropyl dithiophosphoric acid, pyridine salt of di-isopropyl dithiophosphoric acid, ammonium diethyldithiophosphate, o-toluidine diethyldithiophosphate, zinc diethyldithiophosphate, lead diethyldithiophosphate, copper diethyldithiophosphate, mercuric diethyldithiophosphate, ammonium salt of diphenyl dithiophosphoric acid, aniline salt of diphenyl dithiophosphoric acid, o-toluidine salt of diphenyl dithiophosphoric acid, zinc salt of dicresyl dithiophosphoric acid, ammonium salt of di-isopropyl dithiophosphoric acid, o-toluidine salt of di-isopropyl dithiophosphoric acid, zinc salt of di-isopropyl dithiophosphoric acid, ammonium salt of dibutyl dithiophosphoric acid, aniline salt of dibutyl dithiophosphoric acid, zinc salt of dibutyl dithiophosphoric acid, ammonium salt of diamyl dithiophosphoric acid, aniline salt of diamyl dithiophosphoric acid, o-toluidine salt of diamyl dithiophosphoric acid.

Our invention is, therefore, not to be limited by the specific details appearing in the specification, but the scope thereof is indicated in the claims appended hereto. In the claims we have used the expression "sulphur and phosphorous", which is intended to include these substances not only in the elemental form but also combined in the form of phosphorous pentasulphide.

Throughout the specification and claims, we have used the terms: "di-thiophosphate" and "di-thiophosphoric acid" interchangeably. By reference to the probable formula of the accelerators forming the present invention, it will be seen that these compounds may be considered as either compounds of phosphoric acid or of phosphates, since phosphoric acid may be looked upon as a hydrogen phosphate.

This application is a continuation in part of our co-pending application Serial No. 206,937 filed July 19, 1927.

What we claim is:

1. A vulcanizable rubber composition containing an accelerator having most probably the following structural formula—

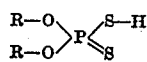

where R is an aliphatic or aromatic radical.

2. A vulcanizable rubber composition containing an accelerator having most probably the following structural formula—

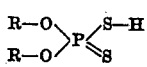

where R is an aliphatic radical.

3. A vulcanizable rubber composition containing an accelerator having most probably the following structural formula—

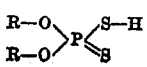

where R is an aliphatic radical having four or five carbon atoms.

4. A vulcanizable rubber composition containing an accelerator comprising the reaction product of amyl alcohol with sulphur and phosphorus.

5. A method which comprises adding to a rubber mix prior to vulcanization an accelerator having most probably the following structural formula—

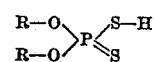

where R is an aliphatic or aromatic radical.

6. A method which comprises adding to a rubber mix prior to vulcanization an accelerator having most probably the following structural formula—

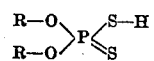

where R is an aliphatic radical.

7. A method which comprises adding to a rubber mix prior to vulcanization an accelerator having most probably the following structural formula—

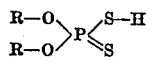

where R is an aliphatic radical having four or five carbon atoms.

8. A method which comprises adding to a rubber mix prior to vulcanization the reaction product of an amyl alcohol with sulphur and phosphorous, and then vulcanizing the mixture.

In witness whereof, we have hereunto subscribed our names this 30th day of December, 1931.

CHARLES J. ROMIEUX.
LUDWIG J. CHRISTMANN.